United States Patent [19]

Ross et al.

[11] 4,121,275
[45] Oct. 17, 1978

[54] ESTER DIELECTRIC FLUID CONTAINING TERT-BUTYL ANTHRAQUINONE

[75] Inventors: Sidney D. Ross, Williamstown; Raynor Linzey, Adams, both of Mass.

[73] Assignee: Sprague Electric Company, North Adams, Mass.

[21] Appl. No.: 810,131

[22] Filed: Jun. 27, 1977

[51] Int. Cl.$^2$ .................. H01B 3/20; C10M 3/20; C10M 3/14
[52] U.S. Cl. ........................ 361/319; 252/64; 361/315
[58] Field of Search ............ 252/64; 361/319, 315; 174/17 LF

[56] References Cited

U.S. PATENT DOCUMENTS

| | | | |
|---|---|---|---|
| 2,719,182 | 9/1955 | Ross et al. | 252/63 X |
| 2,897,423 | 7/1959 | Ross | 252/64 X |
| 2,922,938 | 1/1960 | Petley | 361/319 |
| 3,362,908 | 1/1968 | Polito | 252/65 |
| 3,754,173 | 8/1973 | Eustance | 361/319 |
| 3,833,978 | 9/1974 | Eustance | 252/64 X |
| 3,925,221 | 12/1975 | Eustance | 252/63.7 |

FOREIGN PATENT DOCUMENTS

| | | |
|---|---|---|
| 581,878 | 8/1959 | Canada. |
| 1,012,621 | 6/1977 | Canada. |
| 2,446,422 | 4/1975 | Fed. Rep. of Germany. |
| 1,428,746 | 3/1976 | United Kingdom. |

OTHER PUBLICATIONS

Sauer et al., "Stabilization of Dielectrics Operating Under Direct Current Potential", Ind. Eng. Chem., 44(1), 135–140, (Jan. 1952).

Primary Examiner—Harris A. Pitlick
Attorney, Agent, or Firm—Connolly and Hutz

[57] ABSTRACT

An ester dielectric fluid for an AC capacitor with improved corona properties contains a minor amount of tert-butylanthraquinone. The ester may be 2-ethylhexylphthalate or diisononylphthalate, and an epoxide stabilizer is present.

2 Claims, 1 Drawing Figure

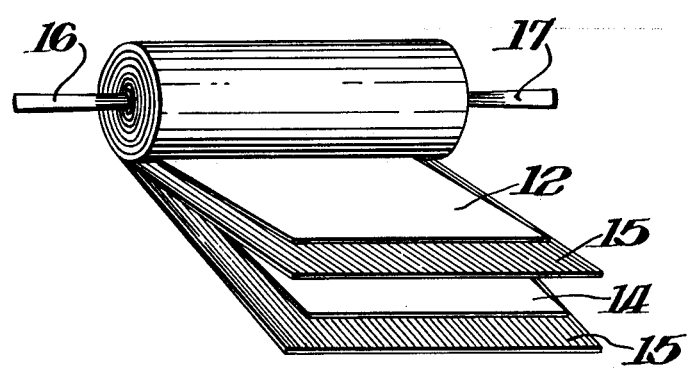

ESTER DIELECTRIC FLUID CONTAINING TERT-BUTYL ANTHRAQUINONE

BACKGROUND OF THE INVENTION

This invention relates to a dielectric composition. More particularly, it relates to the stabilization of an ester dielectric fluid to improve corona properties.

There are many types of dielectric liquid impregnated capacitors. These include large capacitors for high voltage use (above 660V AC) and for low voltage power use and may be referred to as energy storage capacitors, power factor correction capacitors, and high frequency capacitors. The smaller capacitors include those used in lighting and as motor run capacitors. This invention particularly relates to the last category but is not limited thereto.

One class of dielectric fluids which has enjoyed widespread use is the polychlorinated biphenyls; these have been the almost exclusive fluid used in power, motor run, and lighting capacitors. With the development of new dielectric materials, such as synthetic resin dielectrics, and the ecological questions raised concerning the use of PCBs, alternate classes of materials have been studied intensively for use as dielectric fluids.

A dielectric fluid for capacitors should have high electric strength and a relatively high dielectric constant, be capable of impregnating the dielectric of the capacitor, be easily purifiable, and have good corona properties. Good corona properties include both high corona starting and high corona extinction voltages; preferably, these voltages should be close in value. The fluid should not be too volatile or it will evaporate in processing, and it should not solidify during use.

Organic ester fluids have properties which are desirable for dielectrics. They did not find wide application because of stability problems, particularly when used in conjunction with paper. Two developments have made the use of ester fluids, particularly the phthalates, practical. The first is the recognition that hydrolysis of the ester in the presence of paper, serving as a source of water, is the major difficulty. This difficulty can be overcome by proper substitution of the ester to increase the steric hindrance about the ester carbonyl and thus prevent hydrolysis. Ross and Finkelstein have described this in U.S. Pat. No. 3,740,625, issued June 19, 1973. Further stability to ester fluids is imparted by the addition of epoxides. These materials, which have been used as scavengers for hydrogen and halogens, particularly with the chlorinated diphenyls, have been well described, e.g., by Eustance in U.S. Pat. No. 3,754,173 issued Aug. 21, 1973, U.S. Pat. No. 3,833,978 issued Sept. 10, 1974, and in U.S. Pat. No. 3,925,221 issued Dec. 9, 1975.

SUMMARY OF THE INVENTION

It is an object of this invention to provide a dielectric fluid with improved corona properties.

It is a further object of this invention to provide an organic ester dielectric fluid which is easily purified. Practical considerations make this important. In a typical impregnation cycle as little as 20% of the fluid may end up in the capacitors, and the remaining dielectric fluid must be repurified and recycled.

It is also an object of this invention to provide an organic ester dielectric fluid with a low additive level so as to obtain maximum benefit from the dielectric properties of the base material, and so as not to depress the dielectric constant.

It has been discovered that the corona properties of such an organic ester dielectric fluid can be improved by the addition of a minor amount of tert-butylanthraquinone.

Accordingly, there is provided a dielectric fluid based on diisononylphthalate or di-2-ethylhexylphthalate which contains up to 1%, preferably 0.5%, of an epoxide and between 0.1 to 2% of tert-butylanthraquinone. The epoxide, as mentioned above, seems to eliminate some early failures and to have some beneficial effect on life.

BRIEF DESCRIPTION OF THE DRAWING

Reference should now be made to the appended FIGURE of the drawing which shows a partly unwound capacitor section in which the stabilized dielectric fluid of the invention is used as the impregnant. This convolutely wound capacitor section consists of two electrode foils 12 and 14 separated by a dielectric spacer material 15. Such a capacitor section preferably consists of aluminum foil separated by a thin calendered kraft paper dielectric spacer material. Flat, flexible, metallic electrically conducting tabs 16 and 17 are wound into the capacitor section so as to electrically contact their respective capacitor electrodes to extend from the opposite ends of the section 10. The section which is impregnated after incorporation into a housing of any of the well-known types for electrostatic capacitors has its electrodes connected to the respective terminals of the housing by means of tabs 16 and 17. The novel dielectric fluid composition is introduced into the capacitor section by vacuum impregnation methods which are well-known in the art.

DESCRIPTION OF THE PREFERRED EMBODIMENTS

The capacitor of the construction shown in the drawing was impregnated with the dielectric composition of the present invention. The capacitor sections tested below consisted of two superimposed aluminum foils 0.22 mil thick and 2¼ in. wide separated by 2 layers of 0.45 mil thick and 2⅜ in. wide kraft paper. The capacitor unit was rated at 5 $\mu f$ and 370V AC. The impregnant was introduced by well-known vacuum means. While kraft paper separators were used in the test capacitors, other separator materials may be used, such as plastic films or combinations with paper.

In the following table, life test data for more than 500 hrs. at 740V AC (twice rated voltage) are presented for units fabricated as above. The dielectric fluid was diisononylphthalate containing 0.5% 3,4- epoxycyclohexylmethyl-3,4- epoxycyclohexane-carboxylate and the noted amounts of tert-butylanthraquinone (TBA). $C_{SV}$ and $C_{EV}$ refer to corona starting voltage and corona extinction, respectively.

Table I

|  | TBA | $C_{SV}$ | $C_{EV}$ | Failure |
| --- | --- | --- | --- | --- |
| Base fluid | — | 500 | 300 | 5/12 |
| " | +0.1% | 700 | 500 | 4/7 |
| " | +0.5% | 800 | 550 | 0/9 |
| " | +1.0% | 1000 | 1000 | 0/8 |
| " | +2.0% | 1000 | 1000 | 2/9 |

In addition, even 2% of the additive changed the dissipation factor from 0.34 for the base fluid to 0.37. The breakdown voltage (4300 for the base fluid) was virtually unchanged at 1% additive level and 4000 at 2% additive level. We prefer to use up to 2% of the additive and preferably 1%. We do not wish to be bound by any particular mechanism for corona, but if it should be a chain reaction of some type, then the tert-butylanthraquinone may act as a chain interrupter.

What is claimed is:

1. An AC capacitor comprising a plurality of electrodes separated by a dielectric spacer and a dielectric fluid composition impregnating said spacer and consisting of diisononylphthalate, up to 1% of 3,4-epoxycyclohexylmethyl-3,4-epoxycyclohexanecarboxylate as stabilizer, and up to 2% tert-butylanthraquinone to increase corona start voltage.

2. An AC capacitor according to claim 1 wherein said fluid consists of diisononylphthalate stabilized by 0.5% of 3,4-epoxycyclohexylmethyl-3,4-epoxycyclohexanecarboxylate and containing 1% tert-butylanthraquinone.

* * * * *